Feb. 9, 1943.   F. R. LABIN ET AL   2,310,898
GAME
Filed Feb. 17, 1941   3 Sheets-Sheet 1

INVENTORS
Frank R. Labin &
Stephen Szulist,
BY
Beau, Brooks, Buckley & Beau. ATTORNEYS Feb. 9, 1943.  F. R. LABIN ET AL  2,310,898
GAME
Filed Feb. 17, 1941  3 Sheets-Sheet 2

INVENTORS
Frank R. Labin &
Stephen Szulist,
BY Beau, Brooks, Buckley & Beau.
ATTORNEYS Feb. 9, 1943. F. R. LABIN ET AL 2,310,898

INVENTORS
Frank R. Labin &
Stephen Szulist,
BY Beau, Brooks, Buckley & Beau.
ATTORNEYS Patented Feb. 9, 1943

2,310,898

UNITED STATES PATENT OFFICE 2,310,898

GAME

Frank R. Labin and Stephen Szulist, Buffalo, N. Y.; said Szulist assignor to said Labin Application February 17, 1941, Serial No. 379,152

19 Claims. (Cl. 273—143)

Our invention relates in general to games and more particularly to games of an educational nature and also to those of chance.

In our invention there are a plurality of rotatable dials on which may be placed various indicia such as mathematical problems, letters, colors, animals and representations of various other objects which are to be matched or to which there is an answer.

The principal object of our invention has been to provide a game particularly for children which will not only be amusing but instructive as well.

A further object of our invention has been to provide mechanism for such a game which is adaptable to the use of such various kinds of indicia.

A further object has been to provide a plurality of dials mounted for group propulsion and independent rotation, said dials carrying suitable indicia on their peripheries.

Moreover, our device is adapted for use as a question and answer device and as such may be used mathematically for stating various simple problems and making their answers accessible if desired or needed.

Furthermore, our device is applicable to spelling and the dials may be provided with letters for the spelling of, for instance, three-letter words.

Furthermore, our device is provided with a casing having permanently open windows opposite the dials and with a series of windows spaced from the open windows, which latter set of windows are normally covered with shutters which may be opened when and if desired to ascertain the answer to the problem presented through the normally open window.

Another object of our invention has been to provide means for positively stopping the rotation of the dials when and if desired, said means also acting to register the indicia with the openings when the driving mechanism is allowed to return to its normal position.

A further object of our invention has been to provide a simple lock for our device which may be opened only by the insertion of a token of suitable size.

The above objects and advantages have been accomplished by the device shown in the accompanying drawings, of which:

Referring now to the form of invention shown in Figs. 1 to 8, inclusive, our device comprises a casing 10 which encloses all the working parts thereof. This casing is provided with end walls 11 and 12 which are preferably formed integrally with the base portion 13. The cover engages the end portions and the base and is secured to it in well-known manner.

Figure 1:
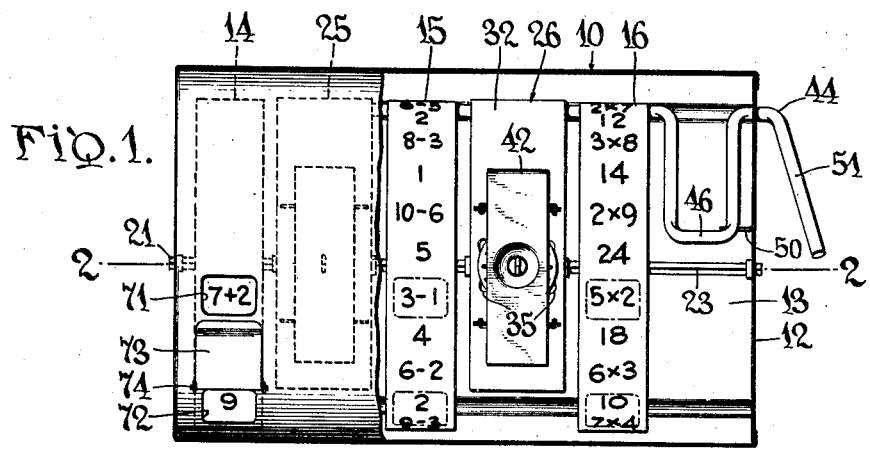
Fig. 1 is a fragmentary, plan view of our complete device showing the dials designed for a mathematical game.
Figure 2:
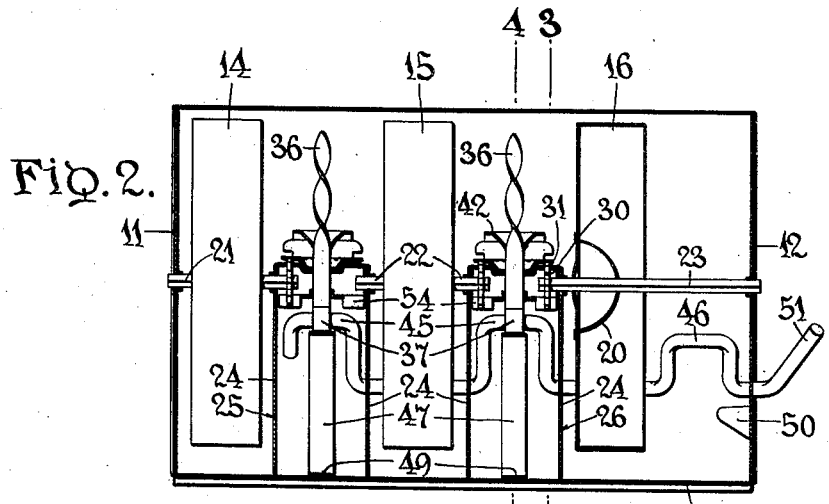
Fig. 2 is a longitudinal, sectional view taken on line 2—2 of Fig. 1.
Figure 6:
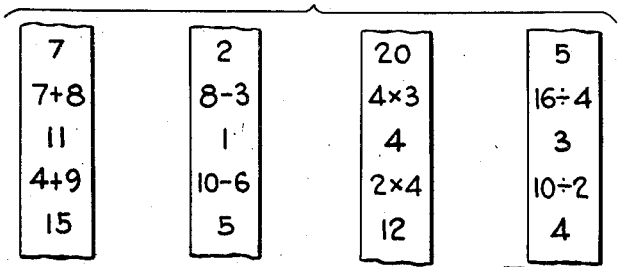
Figs. 6, 7 and 8 show various forms of indicia which may be placed upon the peripheries of a three or four-dial device.
Figure 3:
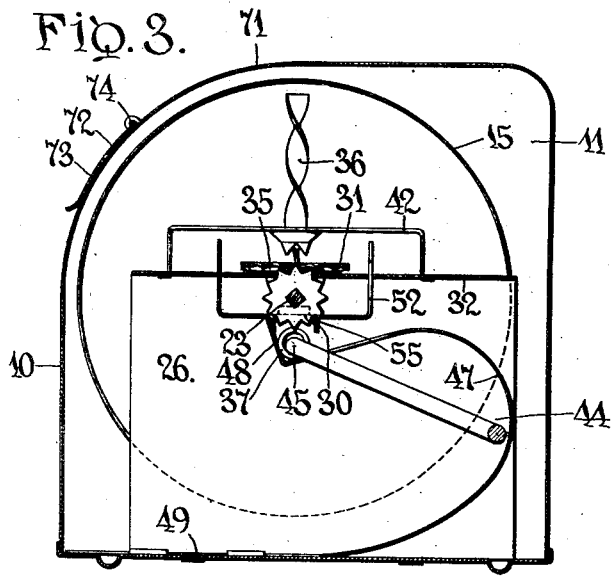
Fig. 3 is a transverse, sectional view taken on line 3—3 of Fig. 2.

In these figures we have shown our device as applied to a mathematical game using but three dials. One of these dials is devoted to addition, another to subtraction, and another to multiplication. In Fig. 6 we shows a fragmentary portion of a fourth dial devoted to division, and it is obvious that the number of dials will depend upon the particular type of game which it is desired to produce.

The first three mentioned groups of mathematical problems are placed upon the peripheries of the dials 14, 15 and 16. These dials are preferably drum-shape in form, having a wide face at the peripheral portion to which is applied the desired indicia. Each of the drums is provided with a hub portion 20. The disc and the hub of each of the dials are each provided with an aperture of polygonal shape for the non-rotatable reception of suitable shafts.

The dial 14 is non-rotatably mounted upon a shaft 21; the dial 15 is similarly mounted upon a shaft 22; and the dial 16 is likewise mounted upon a shaft 23. The shaft 21 is rotatably supported at one end in the end wall 11 of the casing and at the opposite end in one of the side members 24 of a bearing standard 25. The shaft 22 is rotatably mounted in the other side member of the bearing standard 25 at one end and at its opposite end in one of the side members 24 of the bearing standard 26. The shaft 23 has one end rotatably mounted in the end wall 12 and its opposite end supported in the other member 24 of the bearing standard 26.

Non-rotatably mounted upon one end of each of the shafts 21, 22 and 23 is a toothed drive pinion 30 above which is mounted a drive gear 31. As clearly shown in Fig. 2, the drive pinions 30 for the shafts 22 and 23 are mounted in the same bearing standard and the drive gear 31 is therefore engageable with both pinions. Since only one dial remains to be driven, the gear 31 of the bearing standard 25 engages only with the pinion 30 of the shaft 21.

Each of the bearing standards, as hereinbefore pointed out, is preferably formed with two interspaced side members joined together by means of a top member 32. This top member is formed with a depressed portion 33 with which a depressed hub 34 formed on the underside of the gear 31 is engageable when the gear is forced downwardly in contact with the pinion with which it meshes when the parts are moved through their operating stroke. Each of the drive pinions 30 has its periphery extending up through a slotted aperture 35 formed in the top 32 of the bearing standard.

In order to cause each of the drive gears 31 to be rotated, we preferably employ a helical propeller rod 36 which is made of twisted flat material which is passed through a slot 40 formed at the center of the gear. By reciprocating the propeller rod, the gear will be caused to rotate. When the propeller rod which passes through a suitable aperture 41 formed in the top 32 of the bearing standard is pulled downwardly, the gear which is movable axially a limited distance is pressed against and in mesh with the drive pinion or pinions and is thereby rotated so as to cause the rotation of said pinions and the connected shafts and dials. When the rod is on its up stroke, the drive gear will be lifted clear of the pinion or, if the operating mechanism is held in its lower position, the drive gear will rest so lightly upon the pinion as to allow it to freely rotate, and thereby provide means for causing the pinion to be rotated by the drive gears in one direction only. In order to keep the drive gear in place and to prevent its becoming detached from the rod, we provide a guide yoke 42 which is interspaced in relation to the top 32 of the bearing standard and which is suitably secured to the standard. The guide yoke is preferably provided with a downwardly extending and centrally arranged hub 43 which contacts the depressed portion 34 of the face of the gear, keeping it out of contact with the body of the yoke.

In order to cause the reciprocation of the propeller rod 36 we provide a compound crank member 44 which is rotatably supported in suitable bearings formed in the end wall 12 of the casing and in the members 24 of the bearing standards 25 and 26. This crank is provided with crank pins 45 formed by the return bend portions of the crank, one arranged between each pair of side members 24 of the bearing standards 25 and 26. An additional crank pin 46 is provided which engages with a stop 50 formed on the end wall 12 of the casing when the parts have been operated to their predetermined positions. An operating arm 51 is formed on the end of the crank and extends forwardly on the outside of the casing where it is readily accessible to be depressed, thereby causing the operation of the mechanism.

When the operating arm 51 is depressed to the predetermined limit of its movement all of the propeller rods 36 will be drawn downwardly through the drive gears 31 causing them to be rotated and in turn causing the drive pinions to rotate the shafts carrying the dials. In order to return the operating arm 51 and the crank 44 to normal operating positions, we provide a spring 47 for each of the crank pins 45 having its free end 48 engageable with the bearing part 37 of the propeller rod, and having its lower end 49 secured to the base 13 of the device. If the operating arm is held down, the dials will be free to rotate because of the momentum given to them and will gradually come to rest. It may, however, be desirable to stop the dials before they have normally come to rest and to accomplish this we provide a stop yoke 52 which is suspended under the top member 32 of each bearing standard and permitted to move vertically a predetermined amount. Each yoke is provided with an upstanding hub portion 53 for the passage and support of the propeller rod 36 and it is also provided at each side thereof under each drive gear with a slot 54 formed by downwardly extending tabs 55. The walls of the slot 54 will engage with the teeth of the drive pinion when the yoke is forced upwardly. So long as the crank pins are held in the position shown in Fig. 4, the drive pinions will be free to rotate as hereinbefore described, but when the operating arm is raised and has reached its normal position the spring 47 will force the crank pins 45 upwardly and the end 48 of the spring will bear against the lower part of the stop yoke 52 and cause it to be forced upwardly so that the teeth of the drive pinion will be engaged.

Figure 9:
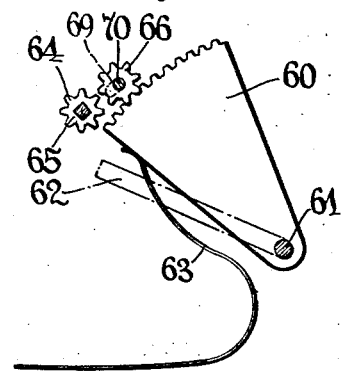
Fig. 9 is a fragmentary view of a modified form of operating device.
Figure 4:
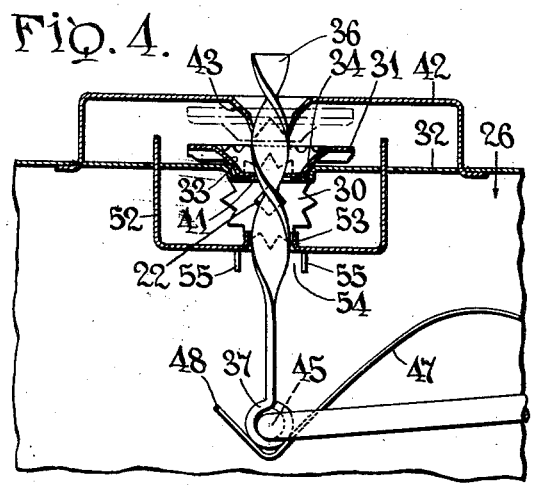
Fig. 4 is an enlarged, fragmentary, transverse, sectional view taken on line 4—4 of Fig. 2.

In the form of device shown in Fig. 9 we illustrate a modified form of operating device. In this form a gear segment 60 is rotatably mounted upon a shaft 61 and operable by means of an operating arm 62. The gear segment is pushed upwardly normally by means of a spring 63. A gear pinion 64 is mounted upon the shaft 65 carrying the dial (not shown) and the teeth of the segment 60 and pinion 64 are connected by means of an idler pinion 66. This idler pinion is mounted upon a suitable shaft 70 which is mounted in a slot 69 so that the teeth of the idler pinion may be moved out of meshing engagement with either the teeth of the segment or the teeth of the pinion during the up movement or idle stroke of the gear segment. Upon the downward movement of the gear segment on its power stroke the idler gear will be drawn into mesh with the teeth of the segment and the pinion and thereby cause rotation of the pinion. After the gear segment is allowed to return to its normal position, the pinion 64 will be permitted to freely rotate since the idler pinion is resting upon the pinion very lightly due only to its weight which will not interfere with the free rotation of the pinion 64.

Figure 7:
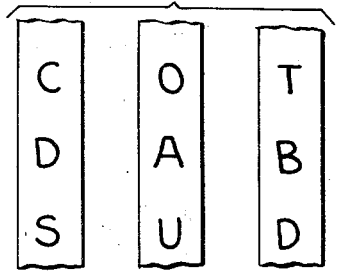
Figure 5:
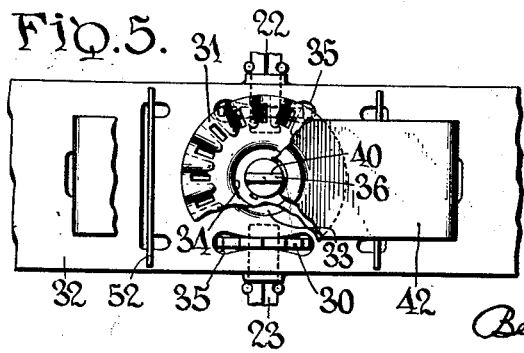
Fig. 5 is an enlarged, fragmentary, top, plan view of one of the bearing standards.
Figure 8:
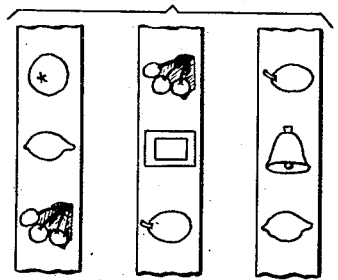

When our game is adapted for use as a question and answer game it is then desirable to have a fixed opening 71 in the casing through which the problem or question is visible, and also a second opening 72 through which the answer may be seen. It is preferable to cover the opening 72 with a hinged shutter 73 which is suitably pivoted at 74. If the user of the game cannot solve the problem or does not know the answer without assistance, then the shutter 73 may be lifted and the answer read through the opening 72. When the device is to be utilized in this manner, the form of dial shown in Fig. 6 is an example. Here one dial is for problems of subtraction, another for addition, another for multiplication and another for division. The problems and answers are so placed upon the dial with relation to the teeth of the driven pinion and for engagement with the stop yoke that a problem will always come to rest through the opening 72, the answer being so spaced that it will be visible through the opening 72. Where the device is to be adapted to the use of letters in the formation of, for instance, three-letter words, only one opening for exposing the letters need be employed, as shown in Fig. 7. The same thing is true when the device is to be used as a game of chance having any desired form of indicia, as illustrated in Fig. 8.

Figure 10:
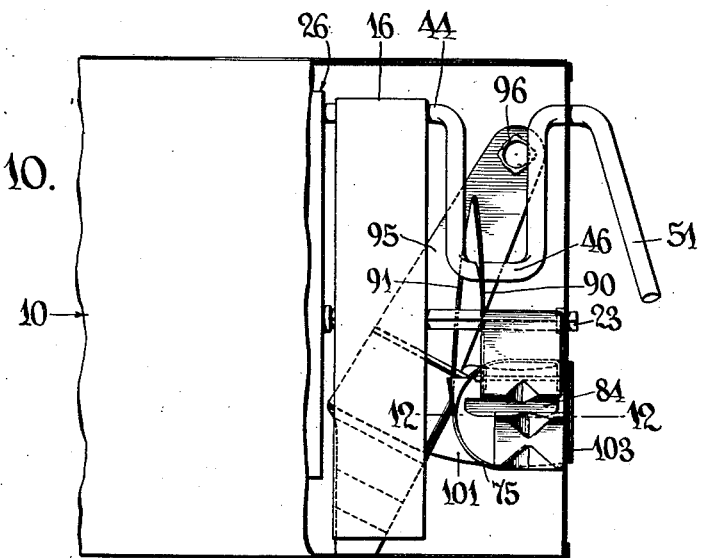
Fig. 10 is a fragmentary, plan view of a token lock as applied to our device.
Figure 11:
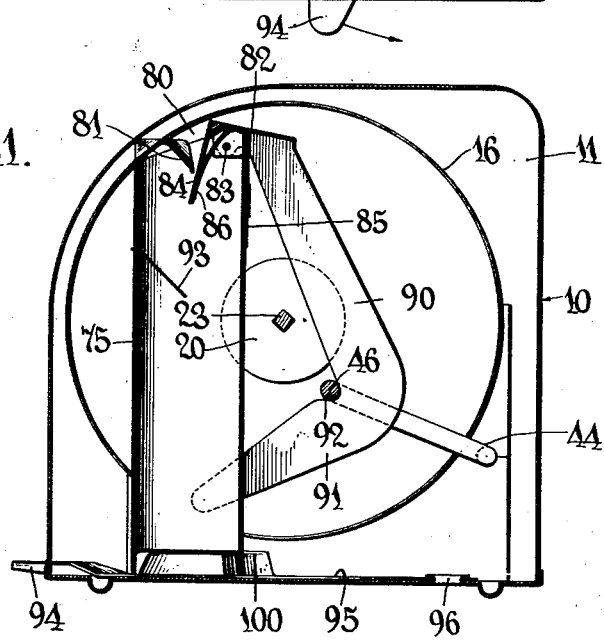
Fig. 11 is a sectional elevation of the same taken on line 11—11 of Fig. 10.
Figure 12:
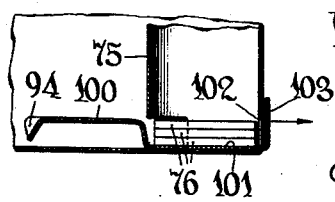
Fig. 12 is a fragmentary, sectional view of the token ejector taken on line 12—12 of Fig. 10.

When it is desired to lock our game and to make it operable only through the use of tokens inserted therein it may be provided with a token lock, as clearly shown in Figs. 10, 11 and 12.

As shown in these figures a token magazine 75 is secured to the end wall 12 of the casing 10 and is of such size and proportion as to accommodate a number of tokens 76 (see Fig. 10) arranged on top of one another. At the upper end of this tube or magazine we provide a token lock 80. This lock is formed by a depending flange 81 formed from the front wall of the magazine and interspaced in relation thereto. Opposite the depending flange 81 is a token piece 82. This token piece is pivoted at 83 to the rear wall of the magazine and is provided with a depending arm 84 which is urged toward the depending flange 81 by means of a flat spring 85. This spring is secured to the back wall of the magazine and has its forward end 86 bearing against the inside of the depending arm 84 so as to urge it toward the depending flange.

The token piece is provided with a lock latch 90 which extends rearwardly and downwardly behind the magazine. It is provided with a forwardly extending latch arm 91 and with a recess 92 formed in the inner face of the latch arm 91. The recess is formed in the face of the latch arm and is so arranged that it engages the crank pin 46 of the crank 44 and locks the crank against operation by the operating arm 51.

When a token is inserted between the flange 81 and arm 84 the latching lock is forced backwardly, thus releasing the crank pin 46 and allowing the crank to be rotated. As the crank is rotated the crank pin 46 will ride over the upper surface of the latch arm and cause the opening in the token lock to be increased so that the token held therein will be released and allowed to fall to the bottom of the magazine. So as to insure stacking of the tokens as they are dropped into the magazine, we provide a tripping pin 93 which is preferably in the form of a piece of spring wire loosely passed through the front wall of the magazine and extending into the interior thereof. As the token is released from between the flange 81 and arm 84, it strikes the tripping pin which diverts its downward movement and prevents its falling to the bottom of the magazine on edge where it might rest. In striking the pin the token is moved out of the vertical plane and caused to fall in such manner that it will come to rest flatly at the bottom of the magazine.

To remove the tokens from the magazine we provide a token ejector 94 which is in the form of an arm 95 extending rearwardly across the bottom 13, and pivoted at 96. The ejector is normally arranged in the position shown in Fig. 10 where the arm thereof is out of register with the magazine and it is formed with a raised portion 100 at the point which is engageable with the bottom of the magazine. Extending from the arm 95 opposite the portion 100 and arranged under the magazine is a token arm 101. This arm extends outwardly through a slot 102 formed in the end wall 12. An upstanding flange 103 serves to close the slot when the ejector is in the position shown in Fig. 10. The height of the slot 102 is preferably such as to eject three tokens at a time.

Obviously, some modifications of the details herein shown and described may be made without departing from the spirit of our invention or the scope of the appended claims, and we do not, therefore, wish to be limited to the exact embodiment herein shown and described, the form shown being merely a preferred embodiment thereof.

Having thus described our invention, what we claim is:

1. A game comprising a casing, a plurality of independently rotatable dials carried by said casing, means for individually rotating each of said dials, comprising a shaft non-rotatably fixed in the dial, a drive pinion fixed on said shaft, a drive gear for cooperation with said pinion, means for causing said pinion to be rotated by said drive gear upon rotation thereof in one direction, operating means for rotating said drive gear, said operating means serving to move said drive gear out of meshing relation with said pinion when said drive gear stops its actuating rotation, and a stop yoke engageable with each of said pinions for arresting the rotation of said dials.

2. A game comprising a casing, a plurality of independently rotatable dials carried by said casing, means for individually rotating each of said dials, comprising a shaft non-rotatably fixed in the dial, a drive pinion fixed on said shaft, a drive gear for cooperation with said pinion, means for causing said pinion to be rotated by said drive gear upon rotation thereof in one direction, operating means for rotating said drive gear, said operating means serving to move said drive gear out of meshing relation with said pinion when said drive gear stops its actuating rotation, a stop yoke engageable with each of said pinions for arresting the rotation of said dials, and means connected with said operating means for coaction with said stop yoke to bring it into engagement with said pinions.

3. A game comprising a casing, a plurality of independently rotatable dials mounted within said casing and having disposed on their peripheries a series of problems and a series of answers to said problems arranged in spaced relation therewith, said casing being formed with an opening through which the problem may be seen, said casing being also formed with a normally closed interspaced opening through which the answer may be seen, a shutter disposed over said last mentioned opening, said dials being independently mounted for rotation, means for causing the dials to rotate, and means for registering the indicia on the dials with the openings.

4. A game comprising a casing, having end walls, interspaced bearing standards carried by said casing and interspaced in relation to said walls, a series of shafts rotatably carried by said end walls and said bearing standards, a dial non-rotatably mounted upon each shaft, a pinion non-rotatably mounted at one end of each shaft, an axially movable drive gear rotatably carried by each bearing standard, and operating means arranged between the dials for causing the rotation thereof, means for moving said drive gears axially into coactive relation with said pinions during the power stroke of said operating means.

5. A game comprising a casing, a plurality of independently rotatable dials carried by said casing, means for rotating each of said dials comprising a shaft, a drive pinion carried by said shaft, a drive gear mounted above said pinion and having a limited axial movement, a helical propeller rod passing through said drive gear, and a crank carried by said casing and connected to each of said propeller rods to reciprocate the same.

6. A game comprising a casing, a plurality of independently rotatable dials carried by said casing, means for rotating each of said dials comprising a shaft, a drive pinion carried by said shaft, a drive gear mounted above said pinion and having a limited axial movement, a helical propeller rod passing through said drive gear, a crank carried by said casing and connected to each of said propeller rods to reciprocate the same, and means controlled by said crank for causing the pinions to be arrested.

7. A game comprising a casing, having end walls, interspaced bearing standards carried by said casing and interspaced in relation to said walls, a series of shafts rotatably carried by said end walls and said bearing standards, a dial non-rotatably mounted upon each shaft, a pinion non-rotatably mounted at one end of each shaft, a drive gear rotatably carried by each bearing standard, a stop yoke carried by each bearing standard and movable to engage the teeth of said pinion, operating means for rotating said dials, and means coacting with said operating means for engaging said stop yoke.

8. A game comprising a casing, having end walls, interspaced bearing standards carried by said casing and interspaced in relation to said walls, a series of shafts rotatably carried by said end walls and said bearing standards, a dial non-rotatably mounted upon each shaft, a pinion non-rotatably mounted at one end of each shaft, a drive gear rotatably carried by each bearing standard, a stop yoke carried by each bearing standard and movable to engage the teeth of said pinion, a spring for normally forcing said stop yoke in engagement with said pinion, operating means associated with said spring to release said yoke thereby permitting free rotation of said dials.

9. A game comprising a casing, a plurality of independently rotatable dials carried by said casing, means for operating each of said dials comprising a shaft, a drive pinion carried by said shaft, a drive gear mounted above said pinion and having a limited axial movement, a helical propeller rod passing through said drive gear for imparting rotation thereto, a stop yoke supported below said drive pinion and engageable therewith to cause the rotation of the drums to be interrupted, and manually operated means for reciprocating said propeller rod.

10. A game comprising a casing, a plurality of independently rotatable dials carried by said casing, means for individually rotating each of said dials, comprising a shaft non-rotatably fixed in the dial, a drive pinion fixed on said shaft, a drive gear for cooperation with said pinion, means for causing said pinion to be rotated by said drive gear upon rotation thereof in one direction only, operating means for rotating said drive gear, said operating means serving to move said drive gear out of meshing relation with said pinion when said drive gear stops its actuating rotation.

11. A game comprising a casing, a plurality of independently rotatable dials carried by said casing, means for individually rotating each of said dials, comprising a shaft non-rotatably fixed in the dial, a drive pinion fixed on said shaft, a drive gear for cooperation with said pinion, means for causing said pinion to be rotated by said drive gear upon rotation thereof in one direction only, axially movable operating means passing through said drive gear for rotating said drive gear, said operating means serving to move said drive gear out of meshing relation with said pinion when said drive gear stops its actuating rotation.

12. A game comprising a casing, a plurality of shafts rotatably mounted in said casing and arranged end to end, a dial non-rotatably carried by each shaft, a drive pinion fixed to each shaft, a plurality of axially floating drive gears arranged in driving relation to said drive pinions, means for limiting the axial movement of said drive gears, and reciprocating means cooperating with said drive gears to draw them into meshing engagement with said pinions when reciprocated in one direction to cause the rotation of said dials, said last-mentioned means being adapted to move said drive gears away from said pinions when reciprocated in the opposite direction.

13. A game comprising a casing, a plurality of shafts rotatably mounted in said casing and arranged end to end, a dial non-rotatably carried by each shaft, a drive pinion fixed to each shaft, an axially floating drive gear arranged in driving relation to each group of two adjacent drive pinions, means for limiting the axial movement of said drive gears, and reciprocating means cooperating with said drive gears to draw them into meshing engagement with said pinions when reciprocated in one direction to cause the rotation of said dials, said last-mentioned means being adapted to move said drive gears away from said pinions when reciprocated in the opposite direction.

14. A game, comprising a casing, a plurality of shafts rotatably mounted in said casing and arranged end to end, a dial non-rotatably carried by each shaft, a drive pinion fixed to each shaft, a plurality of axially floating drive gears arranged in cooperative relation to said drive pinion, means for limiting the axial movement of said drive gears, reciprocating means cooperating with said drive gears to draw them into meshing engagement with said pinions in one direction of travel to cause the rotation of said dials and to move them away from said pinions in the opposite direction of travel, and stop means engageable with each of said pinions for arresting the rotation of said dials.

15. A game comprising a casing, a plurality of shafts rotatably mounted in said casing and arranged end to end, a dial non-rotatably carried by each shaft, a drive pinion fixed to each shaft, an axially floating drive gear arranged in driving relation to each of a group of two adjacent drive pinions, means for limiting the axial movement of said drive gears, reciprocating means cooperating with said drive gears to draw them into meshing engagement with said pinions in one direction of travel to cause the rotation of said dials and to move them away from said pinions in the opposite direction of travel, and stop means engageable with each group of two adjacent pinions for arresting the rotation of said dials.

16. A game comprising a casing, a plurality of shafts rotatably mounted in said casing and arranged end to end, a dial non-rotatably carried by each shaft, a drive pinion fixed to each shaft, drive means engageable with said pinions at one of the sides thereof for rotating the same, and stop means engageable with said pinions at opposite sides thereof for arresting the rotation of said dials.

17. A game comprising a casing, a plurality of independent stub shafts rotatably mounted in end-to-end spaced relationship, a dial fixed to each of said shafts and having a portion of its periphery exposed through an opening in the casing, a drive pinion carried by each of said shafts and arranged on adjacent ends thereof, a drive gear engageable with each two adjacent pinions, and means located between the spaced ends of said shafts and engageable with said drive gear for imparting rotative movement thereto.

18. A game comprising a casing, a plurality of rotatable dials carried by said casing, means for independently mounting the dials for separate rotation thereof, normally engaged ratchet means associated with the dials to cause the unison rotation thereof in one direction only, said ratchet means comprising a drive gear and a pinion, manually actuated means for operating said drive gear, a stop for arresting the rotation of said pinion, and means controlled by said actuating means for moving said stop into engagement with said pinion to bring said dials to rest.

19. A game comprising a casing, a plurality of independently rotatable dials carried by said casing, means for rotating each of said dials comprising a shaft, a drive pinion carried by said shaft, a drive gear engageable with said pinion and having a limited axial movement, a helical propeller rod cooperating with said drive gear, whereby axial movement of said propeller rod will impart rotative movement to said gear, and a crank carried by said casing and connected to each of said propeller rods to reciprocate the same.

FRANK R. LABIN.
STEPHEN SZULIST.